United States Patent
Aizawa

(10) Patent No.: US 6,901,806 B2
(45) Date of Patent: Jun. 7, 2005

(54) ELECTRICAL CAPACITANCE SAPPHIRE DIAPHRAGM PRESSURE SENSOR AND A METHOD OF FABRICATING THE SAME

(75) Inventor: Mitsuyoshi Aizawa, Tokyo (JP)

(73) Assignee: Tem-Tech Lab. Co., Ltd., Tokyo (JP)

( * ) Notice: Subject to any disclaimer, the term of this patent is extended or adjusted under 35 U.S.C. 154(b) by 0 days.

(21) Appl. No.: 10/796,212

(22) Filed: Mar. 10, 2004

(65) Prior Publication Data

US 2005/0034527 A1 Feb. 17, 2005

(30) Foreign Application Priority Data

Aug. 14, 2003 (JP) .............................. 2003/293569

(51) Int. Cl.$^7$ .............................................. G01L 9/12
(52) U.S. Cl. .................................................... 73/718
(58) Field of Search .......................... 73/718, 724, 706, 73/708; 361/283.1, 283.2, 283.3, 283.4; 29/25.41, 29/25.42

(56) References Cited

U.S. PATENT DOCUMENTS 5,869,766 A * 2/1999 Cucci et al. .................. 73/706
6,374,680 B1 * 4/2002 Drewes et al. ................ 73/718
6,612,175 B1 * 9/2003 Peterson et al. .............. 73/708

* cited by examiner

*Primary Examiner*—William Oen
(74) *Attorney, Agent, or Firm*—Wenderoth, Lind & Ponack, L.L.P.

(57) ABSTRACT

There is provided a highly accurate electrical capacitance diaphragm pressure sensor capable of reducing temperature drift that arises when a pressure-travel coefficient changes with temperature variations of a fluid whose pressure is sensed. A sapphire diaphragm pressure sensor, in which sapphire diaphragms are arranged in opposing relation, comprises a pressure sensing element (10, 30) having a pressure receiving part (10A, 30A) with a deposition electrode formed on each of the opposing faces of sapphire diaphragms which are provided in opposing relation to each other and a securing part with a metal deposited on a part of each of the surfaces of the sapphire diaphragms, and further comprises a metal base (11, 31) for securing the pressure sensing element at the securing part of the pressure sensing element, a conductive sealing agent (13, 33) for sealing a gap between the securing part on which a metal is deposited and said metal base, and a nickel protective layer (14, 34) for protecting at least said conductive sealing agent from a medium whose pressure is to be measured.

13 Claims, 4 Drawing Sheets

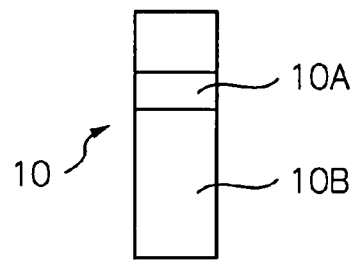
Fig. 1A
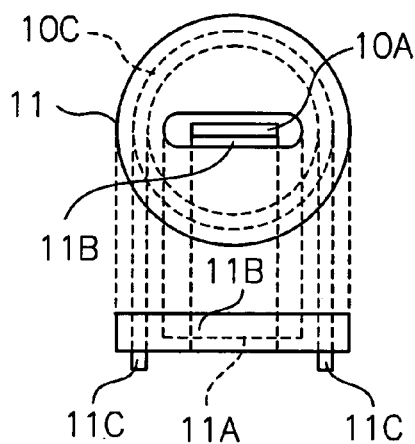
Fig. 1B
Fig. 1C
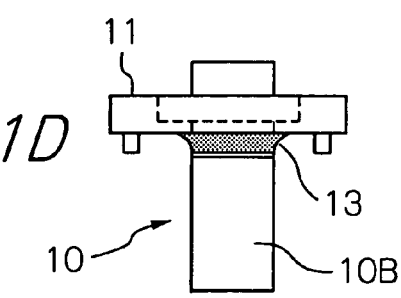
Fig. 1D
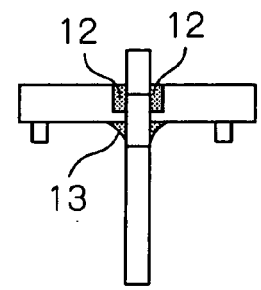
Fig. 1E
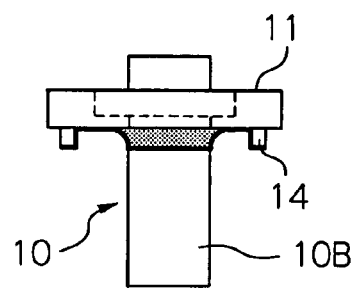
Fig. 1F Fig. 3A
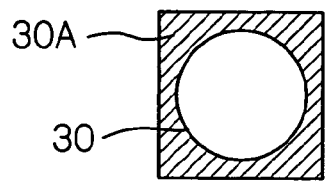
Fig. 3B
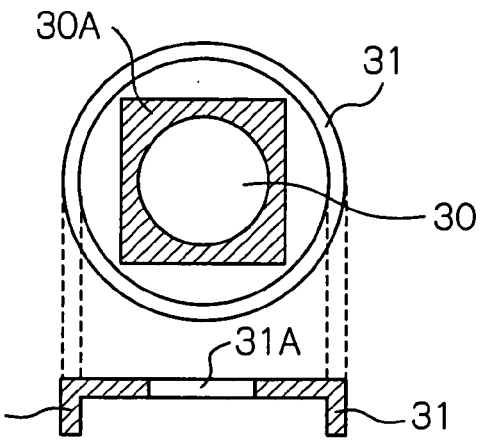
Fig. 3C
Fig. 3D
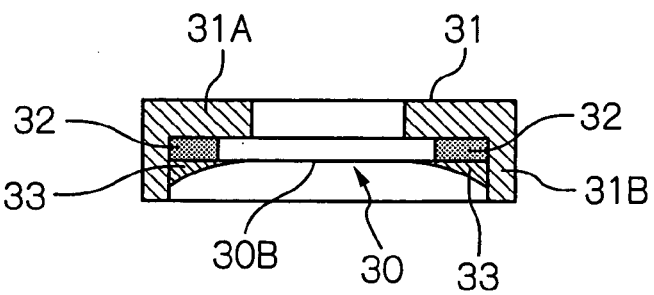
Fig. 3E
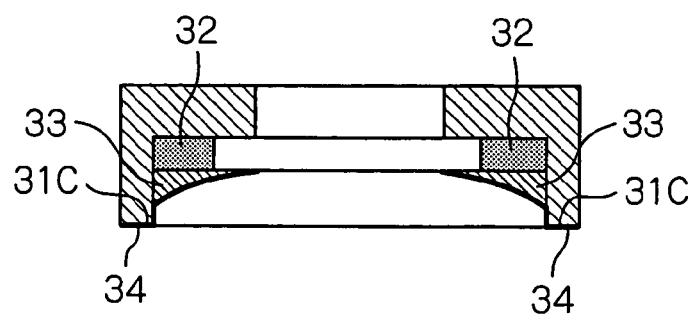

ELECTRICAL CAPACITANCE SAPPHIRE DIAPHRAGM PRESSURE SENSOR AND A METHOD OF FABRICATING THE SAME

BACKGROUND OF THE INVENTION

The present invention is directed to a pressure sensor and a method of fabricating the same, and in particular to an electrical capacitance sapphire diaphragm pressure sensor for sensing a fluid pressure in, for example, a container for chemicals, a pipe for chemicals or the like, and a method of fabricating the same.

Conventional pressure sensors for sensing a fluid pressure in a container for chemicals, a pipe for chemicals or the like, are provided with a diaphragm which acts as a pressure-sensing element, whereby deflection of the diaphragm in response to an applied pressure is converted into an electric signal, to thereby sense a pressure.

Japanese Patent Application No. 2002-130442 discloses an example of such a diaphragm pressure sensor in the invention titled "Electrical capacitance diaphragm pressure sensor".

Such a diaphragm pressure sensor normally comprises: a pressure-sensing element provided with a pressure receiving part including strip-shaped or rectangular flat plate-shaped diaphragms provided in opposing relation and deposition electrodes formed on opposing surfaces of the diaphragms; a housing element for enclosing the pressure receiving part of the pressure-sensing element, the housing element being made of a material which is resistant to corrosion by a fluid whose pressure is to be detected by the sensor; and an electronic circuit for detecting deflection of the diaphragms.

Such a diaphragm pressure sensor as described above is constituted such that when immersing a housing element in a fluid whose pressure is to be measured, the fluid pressure acts on a pressure receiving part, and the resulting variations in a distance between the opposing diaphragms cause a change in capacitance.

In a conventional diaphragm pressure sensor such as that described above, a pressure transfer coefficient varies according to a temperature of a fluid whose pressure is to be measured, and instability such as temperature drift and the like is thereby caused, and as a result, measurement accuracy is significantly compromised. It is known that a leading cause of temperature drift in a diaphragm pressure sensor is a thermal expansion/contraction coefficient of a diaphragm material.

With a view to preventing temperature drift from disadvantageously affecting measurement by a diaphragm pressure sensor, a conventional diaphragm pressure sensor, especially a metal diaphragm pressure sensor, employs a temperature compensation circuit in a pressure sensing circuit for sensing a pressure deflection of a diaphragm or disposes a temperature sensor in a diaphragm to measure a temperature of the diaphragm and provide a compensation electric signal commensurate with the thus measured temperature to a pressure sensing circuit to thereby compensate for temperature drift, that is, a thermal expansion/contraction coefficient of a diaphragm material in accordance with a temperature.

As a pressure-sensing element, a sapphire diaphragm pressure sensor in which a diaphragm is made of a sapphire plate is also known. Since sapphire has a considerably smaller thermal expansion coefficient compared to metallic materials, it can compensate for temperature drift effectively.

However, it is extremely difficult to tightly secure a sapphire diaphragm on a metal base for holding the diaphragm during the process of manufacturing of a sapphire diaphragm pressure sensor, and practical implementation of a sapphire diaphragm pressure sensor is therefore difficult.

There are a few known ways to secure a sapphire diaphragm on a metal base, such as the following:

According to a first method of securing a sapphire diaphragm on a metal base, a sapphire diaphragm is fixed on a metal base using an adhesive. According to this method, however, application of an insufficient amount of adhesive, deterioration of applied adhesive, weak binding between molecules or the like may result in a diaphragm becoming detached from the metal base. Additionally, the adhesive employed may restrict types of medium whose pressure the sensor can measure.

According to a second method, a thin layer of metal is employed to cover a diaphragm and a metal base including its fixtures. However, since a thin layer of metal also covers a surface of a diaphragm on which a pressure acts, thermal expansion of the thin metal layer covering the diaphragm causes temperature drift.

According to a third method, a sapphire diaphragm is contained in a housing element and sealed in a fluid such as silicone or the like. However, thermal expansion of the housing element as well as the fluid causes temperature drift.

According to a fourth method, which is applicable to a circular diaphragm, an O-ring may be employed to secure the diaphragm on the base. According to this method, however, a diaphragm cannot be secured in an entirely stable manner, and a leakage of a medium whose pressure is to be measured is thereby caused. Further, since a medium whose pressure is to be measured tightens the O-ring when the pressure detection begins, detection accuracy drops due to initial deflection of the diaphragm. Still further, media whose pressure can be measured by a sensor are restricted according to the material of which an O-ring is made, and a medium whose pressure is to be measured might leak if a back-up ring is not properly installed.

SUMMARY OF THE INVENTION

The object of the present invention is to provide a highly accurate electrical capacitance sapphire diaphragm pressure sensor capable of detecting a pressure without being affected by temperature drift that occurs when a pressure transfer coefficient changes with variations of a temperature of a fluid whose pressure is to be measured, and a method of manufacturing the same.

According to the present invention, an electrical capacitance sapphire diaphragm pressure sensor comprises:
  a pressure-sensing element having a pressure-receiving part with a deposition electrode being formed on each of the opposing surfaces of sapphire diaphragms which are disposed in opposing relation to each other and a securing part formed by depositing a metal on a portion of the surface of each of the sapphire diaphragms;
  a metal base on which the pressure-sensing element is secured at its securing part;
  a conductive sealing agent for sealing a contact area between the securing part on which a metal is deposited and the metal base; and
  a nickel protective layer for protecting at least said conductive sealing agent from a medium whose pressure is to be measured,
  whereby a pressure of the medium is transferred to the pressure-receiving part and the resulting variations in a distance between the deposition electrodes formed on the opposing surfaces of the sapphire diaphragms cause a change in capacitance.

According to the present invention, a method of fabricating an electrical capacitance sapphire diaphragm pressure sensor comprises the steps of:

providing sapphire diaphragms in opposing relation and forming deposition electrodes on the opposing faces of the diaphragms to thereby form a pressure-receiving part of a pressure-sensing element;

preparing a metal base for securing the pressure-sensing element;

depositing a metal on a securing part of the pressure-sensing element, at which part the pressure-sensing element is secured on the metal base;

fixing, at least partially, the pressure-sensing element to the metal base by means of a thermosetting epoxy resin;

sealing, by means of a conductive sealing agent, a contact area between the securing part on which a metal is deposited and the metal base on the pressure-receiving part side of the pressure-sensing element;

covering with a silicon resin the pressure-sensing element and metal base excluding, at least, a portion sealed with the conductive sealing agent;

forming a nickel protective layer on the sealed portion not covered with the silicon resin by means of electro-casting using a nickel; and stripping off the silicon resin while retaining the nickel protective layer formed by means of electro-casting.

According to the present invention, a sapphire diaphragm, which is formed as a pressure-sensing element, can be readily and yet firmly secured on a metal base. Therefore, the present invention can provide a highly accurate electrical capacitance diaphragm pressure sensor capable of reducing temperature drift, taking advantage of the characteristics of a sapphire diaphragm.

Further, a pressure sensor of the present invention has an extremely simple configuration for firmly securing a sapphire diaphragm on a metal base and therefore, it is easy to manufacture an electrical capacitance diaphragm pressure sensor in accordance with the present invention.

Still further, the present invention can provide a diaphragm pressure sensor having a simple configuration using a sapphire diaphragm capable of reducing temperature drift and therefore, a pressure sensor of the present invention does not need a temperature compensation circuit in its pressure sensing circuit, and the cost of manufacturing the present diaphragm pressure sensor is therefore substantially reduced.

BRIEF DESCRIPTION OF THE DRAWINGS

FIGS. 1A–1F illustrate a strip-shaped pressure-sensing element constituting a main portion of a sapphire diaphragm pressure sensor of the present invention and a metal base for securing the element, and also describe a basic process for manufacturing the sensor;

FIGS. 3A–3E illustrate a rectangular flat plate pressure-sensing element constituting a main portion of a sapphire diaphragm pressure sensor of the present invention and a metal base for securing the element, and also describe a basic process of manufacturing the sensor.

DETAILED DESCRIPTION OF THE INVENTION

Figure 2:
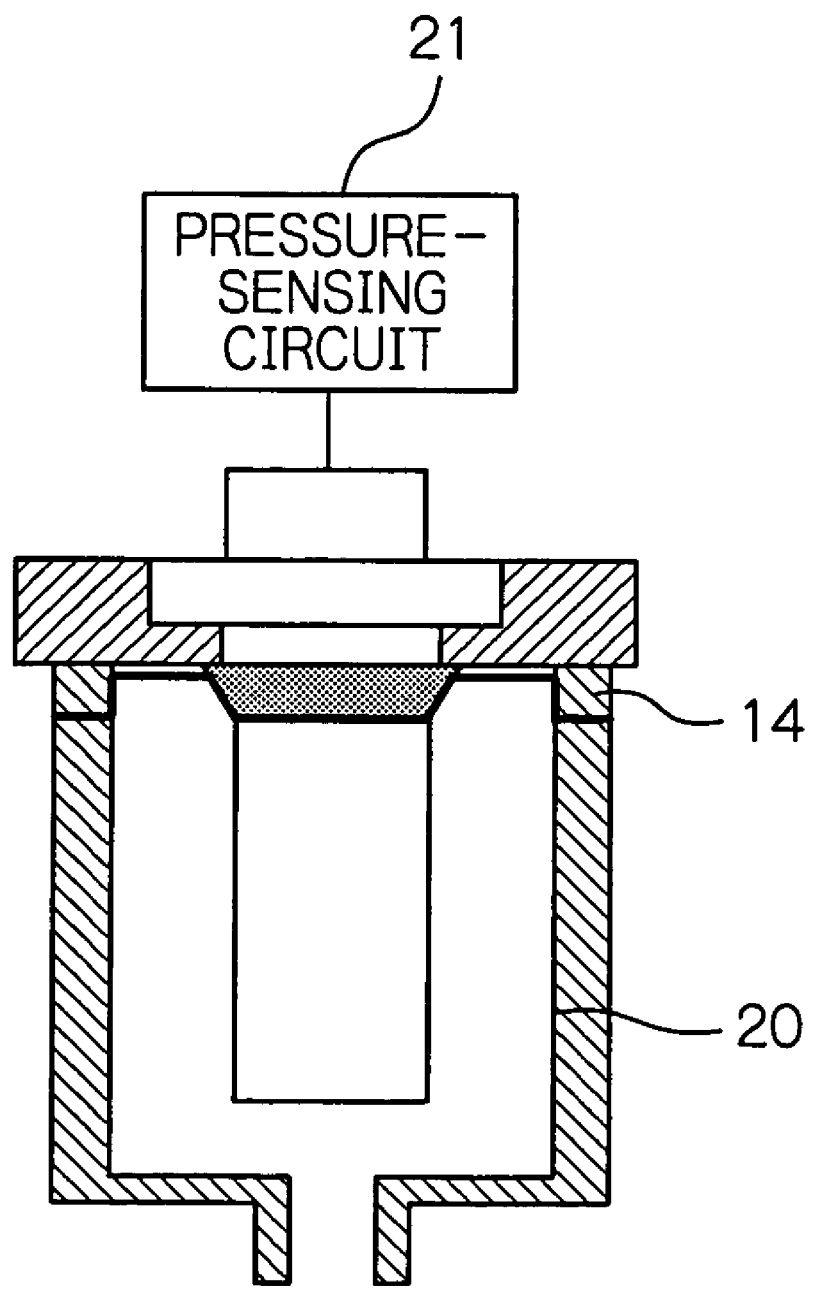
FIG. 2 schematically shows a practical mode of the sapphire diaphragm pressure sensor indicated in FIG. 1.

FIG. 1 is an illustration of the strip-shaped pressure-sensing element (sapphire plate) 10 constituting a main portion of a capacitance sapphire diaphragm pressure sensor. FIG. 1 also illustrates a basic manufacturing process of the pressure sensor.

Although FIG. 1A portrays the pressure-sensing element 10 simply as a strip-shaped member and, for the sake of simplicity, does not show its details, the element actually consists of two strip-shaped sapphire diaphragms arranged in opposing relation with a spacer between them, and deposition electrodes formed on opposing surfaces of the diaphragms, and the two strip-shaped sapphire diaphragms are assembled in an integral fashion to constitute a single unit. The opposing deposition electrodes are respectively connected through a lead wire to an electrode output terminal formed at the end of the pressure-sensing element 10 to output a detected signal.

The surface of the integrally structured sapphire diaphragm, with the exception of the securing part 10A, at which the diaphragm is secured on the metal base 11, is masked, and a metal having strong ionization tendency such as tin, copper, silver, gold or the like is deposited on the securing part 10A as a primary coating for plating processing.

FIG. 1B is a plan view of the metal base 11 for securing the diaphragm, whereas FIG. 1C is a central section view of the same. As indicated in the drawings, the metal base 11 has in the center rectangular slit 11A, through which the strip-shaped pressure-sensing element 10 is inserted, and the adhering area 11B is formed in an approximately rectangular groove that surrounds the slit 11A, to secure the pressure-sensing element 10. Further, the ring-shaped projection 11C for securing a metal outer cylinder (FIG. 2, 20) which houses the pressure-receiving part 10B of the pressure-sensing element 10 is provided on the underside of the metal base 11.

FIG. 1D is an assembly drawing of the strip-shaped pressure-sensing element 10 and the metal base 11 whereas FIG. 1E is a side section view of the same. The pressure-sensing element 10 is inserted into the slit 11A of the metal base 11 to the extent that the securing part 10A of the element 10 aligns with the slit 11A, and the thermosetting epoxy resin 12 is injected into adhering the area 11B and is cured, whereby the pressure-sensing element 10 is secured to the metal base 11 to define the pressure-receiving part 10B of the pressure-sensing element 10. Further, the contact area between the securing part 10A of the pressure-sensing element 10, on which a metal is deposited, and the metal base 11 is completely sealed by the conductive sealing agent 13 such as silver paint or adhesive containing silver particles and the like on the pressure-receiving part 10B side of the pressure-sensing element 10.

In the assembly of the pressure-sensing element 10 and the metal base 11, a nickel coating to form the disc-shaped protective layer 14 (which will be described later) is directly applied by means of electro-casting to the contact area between the securing part 10A and the metal base 11 and to the area where the metal base 11 comes into contact with a medium whose pressure is to be measured. More specifically, the assembly is first subjected to pretreatment, by which the assembly, with the exception of the electrode output terminal (not indicated in the drawing) formed at the end of pressure-sensing element 10 to output a detected signal, and with the further exception of an area to which the protective layer 14 is applied, is completely covered with a silicone resin so that a plating liquid will not permeate through the assembly. The thus pretreated assembly is immersed in a plating bath filled with nickel liquid electrolyte, and nickel electro-casting is conducted, whereby the nickel protective layer 14 is formed.

The nickel protective layer 14 can be formed to have a proper thickness by controlling a plating current and the length of time for which the assembly of the pressure-sensing element 10 and the metal base 11 are immersed in the plating liquid. Additionally, by further immersing a formed nickel protective film in concentrated nitric acid, a passive state film is formed on the surface of the nickel and as a result, a protective layer resistant to corrosion by a strong acid liquid is obtained. Still further, by performing electrolytic polishing on the nickel protective film, the surface of the nickel protective film is smoothed and thus, the film becomes well suited for semiconductor manufacturing equipment, which requires a high level of cleanliness.

Subsequently, the silicon resin formed by the pretreatment is peeled off, whereby a sapphire diaphragm pressure sensor in which the pressure-sensing element 10 is firmly secured on the metal base 11 is obtained.

In the assembly of the pressure-sensing element 10 and the metal base 11 which is provided with the nickel protective layer 14 indicated in FIG. 1F, the nickel protective layer and the metal outer cylinder 20 made of material such as stainless steel or the like are joined at the ring-shaped projection 11C of the metal base 11 by means of welding such as electronic beam welding or the like, whereby a sapphire diaphragm pressure sensor is fabricated.

The strip-shaped sapphire diaphragm pressure sensor indicated in FIG. 2 may be installed in, for example, a pipe for chemicals (not indicated in the drawing), in which case the metal outer cylinder 20 together with the pressure-receiving part 10B of the pressure-receiving element 10 is immersed directly in a chemical solution and a pressure of the chemical solution in the metal outer cylinder 20 is measured. In other words, a measured pressure of a chemical solution is transferred to the pressure-receiving part 10B of the pressure-sensing element 10 and a change in capacitance caused by variations in a distance between the diaphragms provided in opposing relation is output as a detected signal from the pressure-sensing circuit 21.

FIG. 3 illustrates a second embodiment of the present invention, that is, the rectangular flat plate pressure-sensing element (sapphire plate) 30, which constitutes a main part of a capacitance sapphire diaphragm pressure sensor and a manufacturing process thereof.

Although FIG. 3A describes the pressure-sensing element 30 simply as a rectangular flat plate element and, for the sake of simplicity, does not show its details, it actually consists of two rectangular flat plate sapphire diaphragms arranged in opposing relation with a spacer between them, the diaphragms having electrodes formed on their opposing surfaces. The two rectangular flat plate sapphire diaphragms are assembled in an integral fashion to constitute a single unit. The opposing deposition electrodes are respectively connected through a lead wire to an electrode output terminal formed at the end of the pressure-sensing element 30 to output a detected signal.

The surface of the integrally structured sapphire diaphragm, with the exception of the securing part 30A at which the diaphragm is secured on the metal base 31, is masked, and a metal having strong ionization tendency such as tin, copper, silver, gold or the like is deposited on the securing part 30A as a primary coating for plating processing.

FIG. 3B is a plan view of the ring-shaped metal base 31 for securing a diaphragm whereas FIG. 3C is a central section view thereof. As indicated in the drawing, the first ring portion 31A and the second ring portion 31B are formed on the metal base 31 in such a manner that the internal diameter of the second ring portion 31B is greater than that of the first ring portion 31A and the pressure-sensing element 30 covers the first ring portion 31A and is affixed between the first ring portion 31A and the second ring portion 31B.

FIG. 3D is a construction section view of the rectangular flat plate pressure-sensing element 30 and the ring-shaped metal base 31. As indicated in the drawing, the pressure-sensing element 30 is fitted between the first ring portion 31A and the second ring portion 31B of the metal base 31 and the thermosetting epoxy resin 32 is injected in a contact area between the side of the pressure-sensing element 30 and the wall of the second ring portion 31B and the injected resin 32 is cured, whereby the pressure-sensing element 30 is secured on the metal base 31 to thereby define the pressure-receiving portion 30B of the pressure-sensing element 30. Further, on the pressure-receiving portion 30B side of the pressure-sensing element 30, the area between the securing portion 30A with a deposited metal on the pressure-sensing element 30 and the second ring portion 31B of the metal base 31 is tightly sealed by the conductive sealing agent 33 such as silver paint or adhesive containing silver particles or the like.

In the assembly of the pressure-sensing element 30 and the metal base 31 having the above-described construction, a nickel coating in the form of the ring-shaped protective layer 34 (which will be described later) is directly applied to the securing portion 30A, the conductive sealing agent 33 and the end face 31C of the metal base 31 by means of electro-casting. More specifically, pretreatment is performed on the assembly by completely covering the assembly with a silicon resin, with the exception of an area to which the protective layer 34 is applied, so that a plating liquid will not permeate through the assembly. The thus pretreated assembly is immersed in a plating bath filled with nickel liquid electrolyte and nickel electro-casting is conducted to thereby form the nickel protective layer 34.

The nickel protective layer 34 can be formed to have a proper thickness by controlling a plating current and the length of time for which the assembly of the pressure-sensing element 30 and the metal base 31 are immersed in the plating liquid. Additionally, by further immersing a formed nickel protective film in concentrated nitric acid, a passive state film is formed on the surface of the nickel and as a result, a protective layer resistant to corrosion by a strong acid liquid can be obtained.

Subsequently, the silicon resin formed by the pretreatment is peeled off, whereby a sapphire diaphragm pressure sensor in which the pressure-sensing element 30 and the metal base 31 are firmly bonded to each other is obtained.

In the assembly of the pressure-sensing element 30 and the metal base 31 which is provided with the protective layer 34 indicated in FIG. 3E, the nickel protective layer and the metal outer cylinder 40 are joined at the ring-shaped end face 31C of the metal base 31 by means of welding such as electronic beam welding or the like, whereby a sapphire diaphragm pressure sensor is fabricated.

Figure 4:
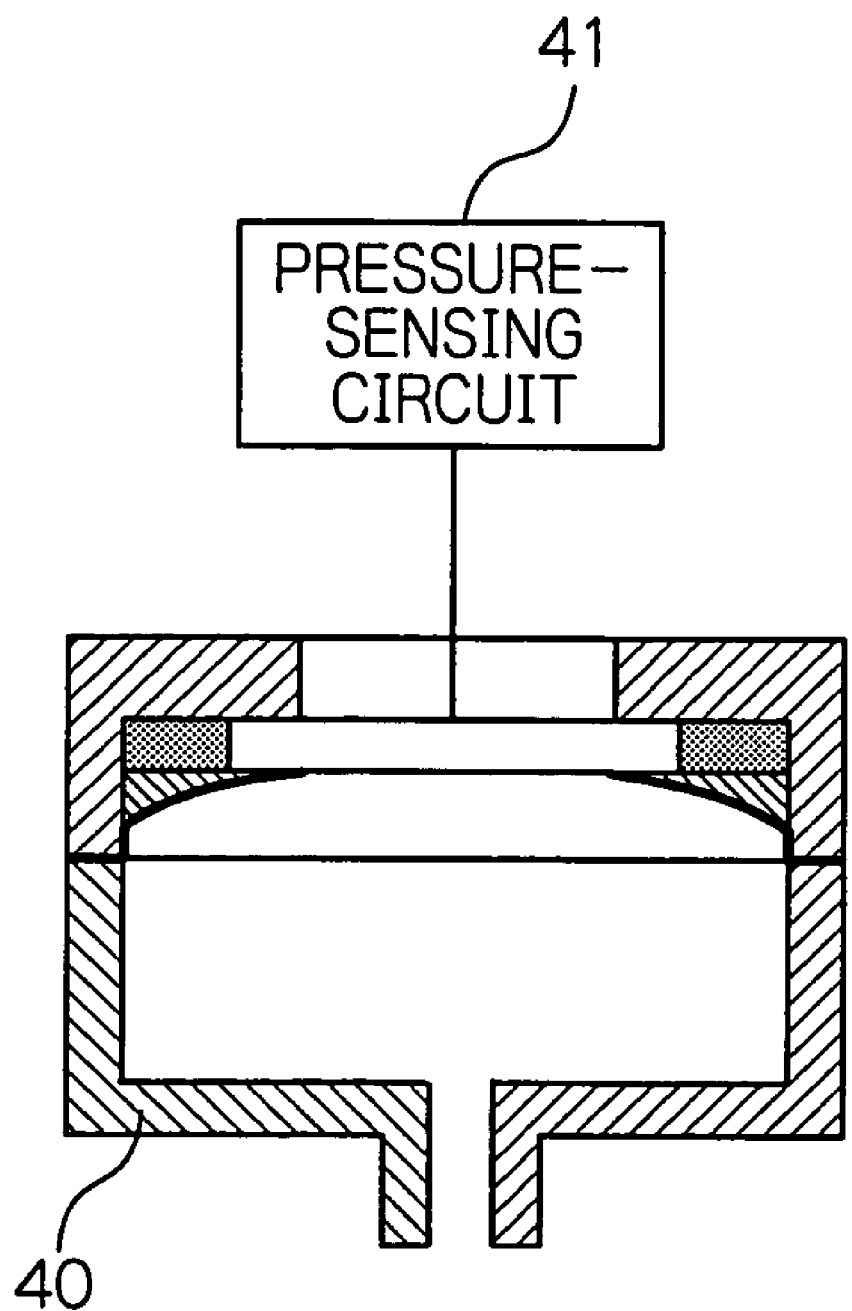
FIG. 4 schematically shows a practical mode of the sapphire diaphragm pressure sensor indicated in FIG. 3.

The rectangular flat plate sapphire diaphragm pressure sensor indicated in FIG. 4 may be installed in, for example, a pipe for chemicals (not indicated in the drawing), in which case the metal outer cylinder 40 together with the pressure-receiving part 30B of the pressure-receiving element 30 is immersed directly in a chemical solution and a pressure of the chemical solution in the metal outer cylinder 40 is measured. In other words, a measured pressure of a chemical solution is transferred to the pressure-receiving part 30B of the pressure-sensing element 30 and a change in capacitance caused by variations in a distance between the diaphragms provided in opposing relation is output as a detected signal from the pressure-sensing circuit 41.

What is claimed is:

1. An electrical capacitance sapphire diaphragm pressure sensor, comprising:
    a pressure-sensing element having a pressure-receiving part with a deposition electrode formed on each of the opposing surfaces of sapphire diaphragms which are provided in opposing relation to each other, and a securing part with a metal deposited on a portion of the surface of each of the sapphire diaphragms;
    a metal base for securing the pressure-sensing element at its securing part;
    a conductive sealing agent for sealing a gap between said securing part with a deposited metal and said metal base; and
    a nickel protective layer for protecting at least said conductive sealing agent from a medium whose pressure is to be measured;
    whereby a measured pressure of the medium is transferred to said pressure-receiving part, and the resulting variations in a distance between the deposition electrodes formed on the opposing faces of the sapphire diaphragms cause a change in capacitance.

2. The sapphire diaphragm pressure sensor as defined in claim 1, wherein said pressure-sensing element is formed as a strip-shaped element.

3. The sapphire diaphragm pressure sensor as defined in claim 1, wherein said pressure-sensing element is formed as a rectangular plate element.

4. The sapphire diaphragm pressure sensor as defined in claim 1, wherein any metal selected from metals having strong ionization tendency such as tin, copper, silver, gold or the like is deposited on said securing part of said pressure-sensing element.

5. The sapphire diaphragm pressure sensor as defined in claim 1, wherein said conductive sealing agent is a silver paint or adhesive containing silver particles.

6. The sapphire diaphragm pressure sensor as defined in claim 1, further provided with a metal outer cylinder for guiding a fluid whose pressure is to be measured, to said pressure receiving part of the pressure sensing element.

7. A method of fabricating an electrical capacitance sapphire diaphragm pressure sensor for sensing a pressure of a fluid, comprising the steps of:
    providing sapphire diaphragms in opposing relation and forming a deposition electrode on each of the opposing surfaces of said diaphragms to thereby form a pressure-receiving part of a pressure-sensing element;
    preparing a metal base for securing said pressure sensing element;
    depositing a metal on a securing part of said pressure sensing element which is secured on said metal base;
    fixing said pressure sensing element, at least partially, to said metal part by means of a thermosetting epoxy resin;
    sealing a contact area between said securing part on which a metal is deposited and said metal base by means of a conductive sealing agent on the pressure receiving part side of said pressure sensing element;
    covering with a silicon resin the pressure-sensing element and metal base excepting, at least, a portion sealed with the conductive sealing agent;
    forming a nickel protective layer on said sealed portion not covered with the silicon resin by means of electro-casting using a nickel; and
    stripping off said silicon resin while retaining the nickel protective layer formed by means of electro-casting.

8. The method of fabricating an electrical capacitance sapphire diaphragm pressure sensor as defined in claim 7, wherein said pressure-sensing element is formed as a strip-shaped element.

9. The method of fabricating an electrical capacitance sapphire diaphragm pressure sensor as defined in claim 7, wherein said pressure-sensing element is formed as a rectangular plate-shaped element.

10. The method of fabricating an electrical capacitance sapphire diaphragm pressure sensor as defined in claim 7, wherein a metal selected from a group of metals having strong ionization tendency such as tin, copper, silver, gold or the like is deposited on said securing part of said pressure-sensing element.

11. The method of fabricating an electrical capacitance sapphire diaphragm pressure sensor as defined in claim 7, wherein said conductive sealing agent is a silver paint or adhesive containing silver particles.

12. The method of fabricating an electrical capacitance sapphire diaphragm pressure sensor as defined in claim 7, further comprising a step of immersing said nickel protective layer in concentrated nitric acid to thereby form a passive state film resistant to a strong acid liquid on the surface of the nickel.

13. The method of fabricating an electrical capacitance sapphire diaphragm pressure sensor as defined in claim 7, further comprising a step of forming a metal outer cylinder for guiding a fluid whose pressure is to be measured to said pressure-receiving part of the pressure-sensing element.

* * * * *